US012145480B2

(12) United States Patent
Stapleton et al.

(10) Patent No.: US 12,145,480 B2
(45) Date of Patent: Nov. 19, 2024

(54) VEHICLE SEAT ASSEMBLY

(71) Applicant: Brose Fahrzeugteile SE & Co. Kommanditgesellschaft, Coburg, Coburg (DE)

(72) Inventors: Dakota Stapleton, Flushing, MI (US); Umesh Handigol, Rochester, MI (US)

(73) Assignee: Brose Fahrzeugteile SE & Co. Kommanditgesellschaft, Coburg (DE)

( * ) Notice: Subject to any disclaimer, the term of this patent is extended or adjusted under 35 U.S.C. 154(b) by 297 days.

(21) Appl. No.: 17/880,216

(22) Filed: Aug. 3, 2022

(65) Prior Publication Data

US 2024/0042903 A1 Feb. 8, 2024

(51) Int. Cl.
*B60N 2/10* (2006.01)
(52) U.S. Cl.
CPC ..................... *B60N 2/10* (2013.01)
(58) Field of Classification Search
CPC ...... B60N 2/10; B60N 2/3065; B60N 2/3031; B60N 2/305; B60N 2/307; B60N 2/36
See application file for complete search history.

(56) References Cited

U.S. PATENT DOCUMENTS

| 5,683,140 | A | * | 11/1997 | Roth | ............. | B60N 2/12 |
| | | | | | | 297/341 |
| 6,056,359 | A | * | 5/2000 | Clark | ............. | B63B 29/04 |
| | | | | | | 292/76 |
| 6,250,704 | B1 | | 6/2001 | Garrido | | |
| 8,424,969 | B2 | | 4/2013 | Kämmerer | | |
| 10,974,621 | B2 | | 4/2021 | Jung et al. | | |
| 2019/0152352 | A1 | * | 5/2019 | Handigol | ............. | B60N 2/12 |

FOREIGN PATENT DOCUMENTS

| DE | 199006662 A1 | 9/2000 |
| DE | 102004054165 A1 | 5/2006 |
| JP | 2019064507 A | 4/2019 |
| KR | 20200143585 A | 12/2020 |
| WO | 2021119576 A1 | 6/2021 |
| WO | 2021214127 A1 | 10/2021 |
| WO | 2022174916 A1 | 8/2022 |

OTHER PUBLICATIONS

International Search Report & Written Opinion for PCT/US2023/084304, Dated Apr. 18, 2024, All together 12 Pages.

* cited by examiner

*Primary Examiner* — Mark R Wendell
(74) *Attorney, Agent, or Firm* — Dickinson Wright PLLC

(57) ABSTRACT

A seat assembly including a base, a seat cushion, a backrest, a cam follower, and a cam. The seat cushion pivotally coupled to the base and the backrest pivotally coupled to the seat cushion. The cam follower coupled to the seat cushion and the cam rotationally coupled to the base and configured to engage the cam follower. The cam configured to engage the cam follower and configured to rotate between a first position, in which the seat cushion is in a use position, and a second position, in which the seat cushion is in a non-use position. As the cam rotates between the first position and the second position, a front portion of the seat cushion may tilt towards the base and a rear portion of the seat cushion may be tilted away from the base.

20 Claims, 9 Drawing Sheets

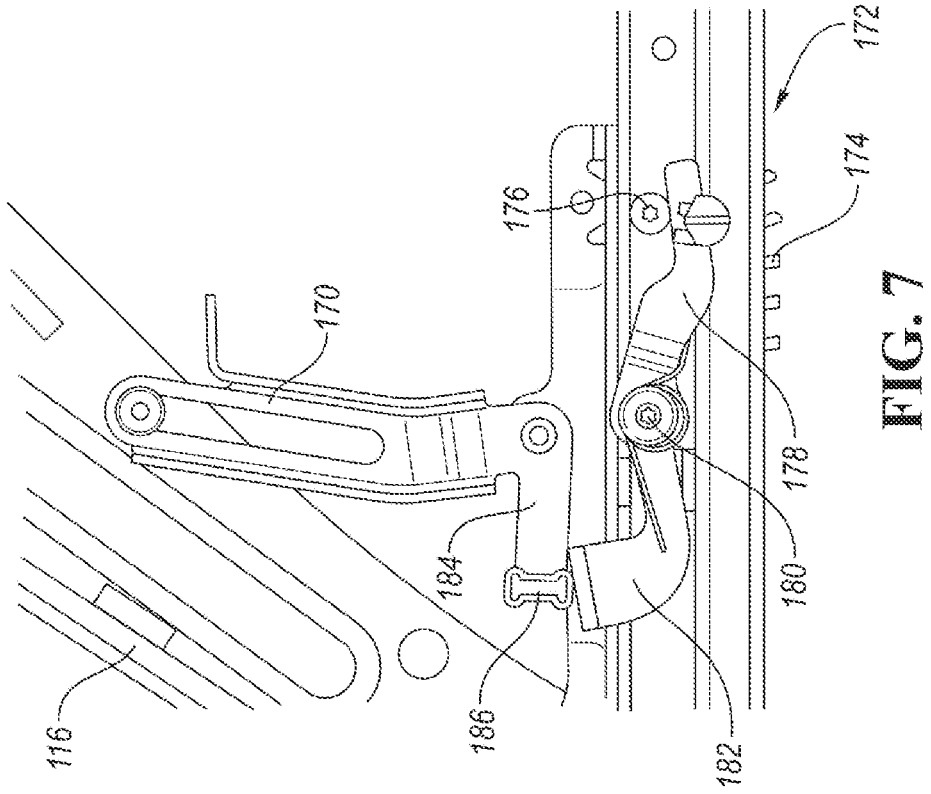
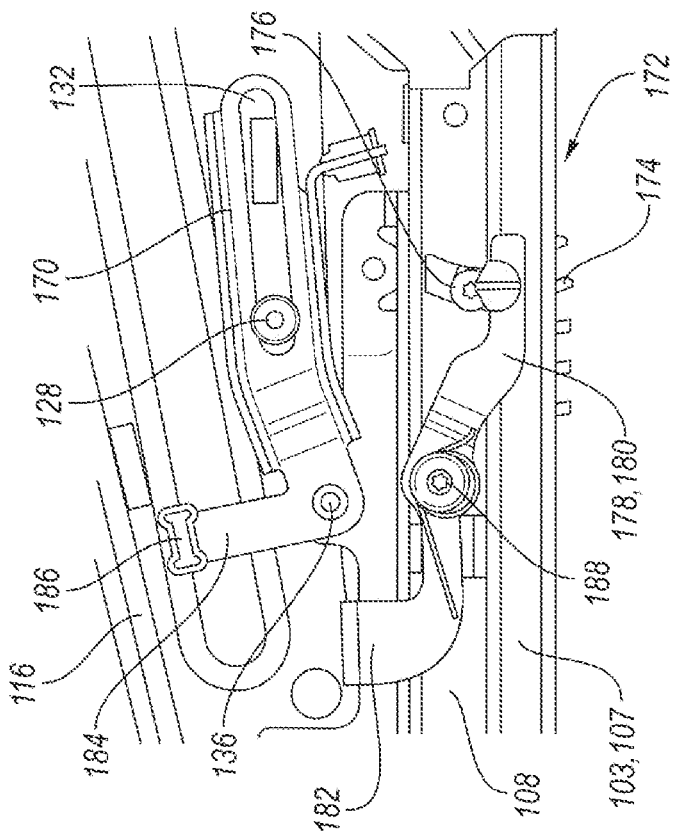

VEHICLE SEAT ASSEMBLY

TECHNICAL FIELD

The present disclosure relates to a seat assembly for use in a vehicle.

BACKGROUND

Vehicles, in particular sport utility vehicles (SUVs), may include three rows of seats to accommodate six to nine passengers. Each of the rows of seats may be configured to change between a use position, a boarding position, in which the seat is positioned to provide access to the second or third rows of seats, and a fold-flat position, in which the seat may be relatively flat to provide additional storage space within the vehicle.

SUMMARY

According to one embodiment, a seat assembly for use in a vehicle is provided. The seat assembly may include a base, a seat cushion, a backrest, a cam follower, and a cam. The seat cushion may be pivotally coupled to the base and the backrest may be pivotally coupled to the seat cushion. The cam follower may be coupled to the seat cushion and the cam may be rotationally coupled to the base and configured to engage the cam follower. The cam may be configured to engage the cam follower and may be configured to rotate between a first position, in which the seat cushion is in a use position, and a second position, in which the seat cushion is in a non-use position. As the cam rotates between the first position and the second position, a front portion of the seat cushion may tilt towards the base and a rear portion of the seat cushion may be tilted away from the base.

According to another embodiment, a seat assembly for use in a vehicle is provided. The seat assembly may be configured to move between a use position, a fold-flat position, and a boarding position. The seat assembly may include a base, a seat cushion, a backrest, a cam follower, and a cam. The seat cushion may include a side panel including a first end, pivotally coupled the base, and second end spaced apart from the first end. The backrest may be pivotally coupled to the seat cushion. The cam follower may be coupled to the seat cushion and the cam may be rotationally coupled to the base and configured to engage the cam follower. The cam may be configured to rotate between a first position, in which the seat cushion is in either the use position or the fold-flat position, and a second position, in which the seat cushion is in the boarding position. As the cam rotates between the first position and the second position, a front portion of the seat cushion may be tilted towards the base and the second end of the side panel may be tilted away from the base.

According to yet another embodiment, a vehicle seat is provided. The vehicle seat may include a base, a seat cushion, a backrest, a cam follower, and a cam. The base may include a fixed rail, a translating rail, and a rail bracket. The fixed rail may be configured to be attached to a vehicle floor, the translating rail may be configured to move along the fixed rail, and the rail bracket may be fixed to the translating rail. The seat cushion may include a side panel that may be provided with a first end and a second end, the first end may be pivotally coupled the upper rail bracket. The backrest may be pivotally coupled to the seat cushion. The cam follower may be coupled to the seat cushion and the cam may be disposed between the first and the second end of the side panel and rotationally coupled to the rail bracket. The cam may be configured to rotate in a first rotational direction, to raise the second end of the side panel away from the base and rotate the first end of the side panel, and a second rotational direction to lower the side panel towards the base.

BRIEF DESCRIPTION OF THE DRAWINGS

FIG. 6 illustrates a detailed perspective view of a portion of another exemplary seat assembly provided with a cam disposed in a first position.

FIG. 7 illustrates a detailed perspective view of the exemplary seat assembly illustrated in FIG. 6 provided with a cam disposed in a first position.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain vehicle seats may be configured to move between a number of positions to provide a number of functions. As an example, the seat may be placed in a use position to support an occupant, the seat may also be placed in a non-use position, such as a boarding position or a fold-flat position. It may be desirable to manipulate the seat between these positions in a relatively fast manner, such as by a spring that may bias portions of the seat to the desired position. As an example, it may also be desirable to maintain an angle between the backrest and the cushion of the seat so that the seat may be moved from the use position to the boarding position without altering the angle of the backrest with respect to the cushion. This may eliminate the need to readjust the position of the backrest after the seat is returned to the use position. Moreover, if the seat is supporting a child seat, the seat may be moved from the use position to the non-use position without removal of the child seat.

Figure 1:
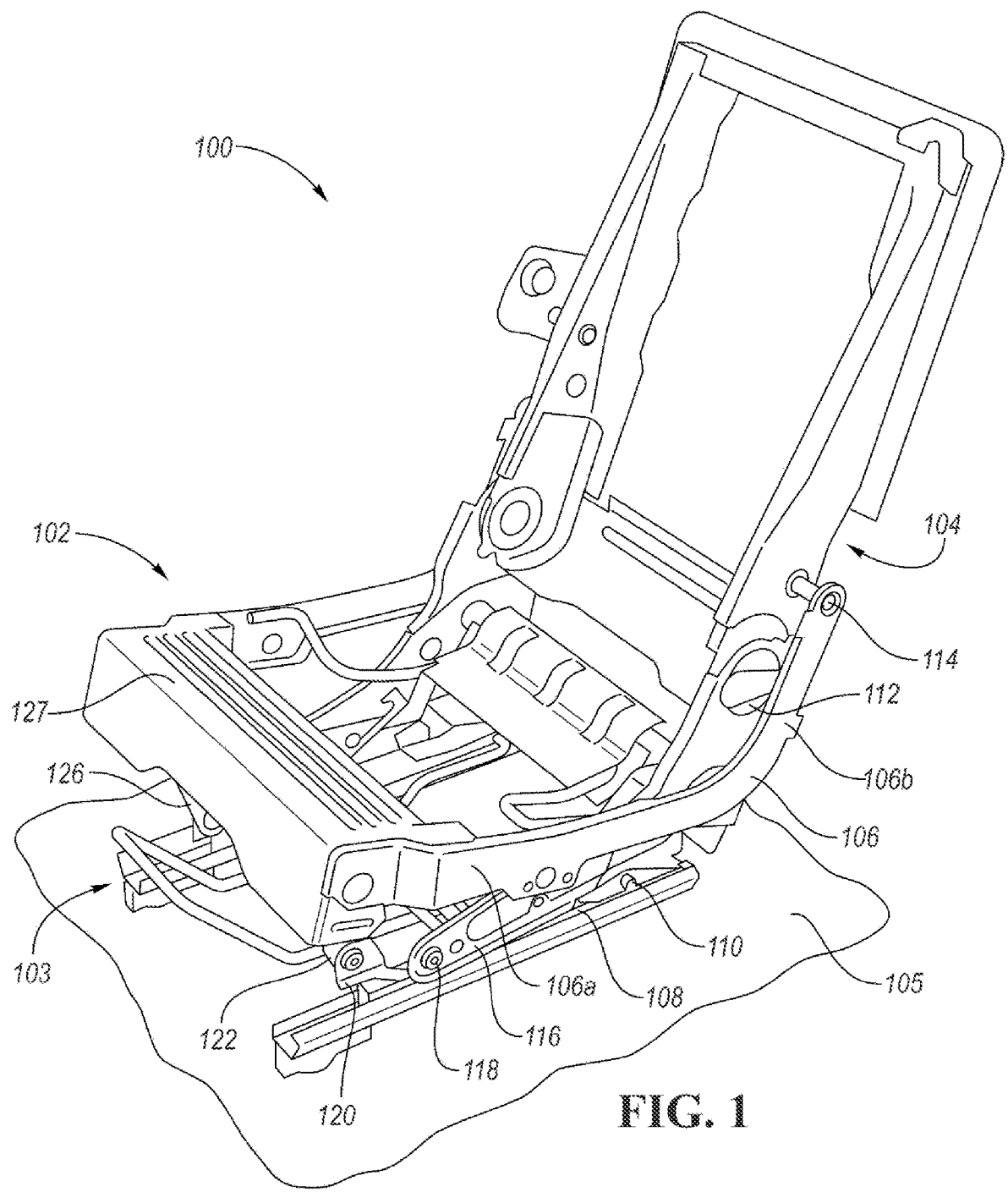
FIG. 1 illustrates a perspective view of an exemplary seat assembly.

FIG. 1 illustrates a perspective view of an exemplary vehicle seat 100 including a seat cushion assembly 102 and a backrest assembly 104, each disposed in a use-position configured to support a vehicle occupant (not illustrated). A base 103 may be provided to support the cushion assembly 102. As an example, the base 103 may include a fixed rail 107 (FIG. 2), that may be fixed to a vehicle floor 105, and a translatable rail 108 that may be configured to move along the fixed rail 107 when the longitudinal position of the vehicle seat 100 is adjusted. The base 103 may include one or more rail brackets, such as a first upper rail bracket 120 and a second upper rail bracket 124 that may be disposed on each lateral side of the vehicle seat 100. As an example, the first and second upper rail brackets 120, 124 may be fixed to the translatable rail or translatable rails 108.

The cushion assembly 102 may include one or more front links 120, 126 that may be pivotally or rotationally coupled to the base 103, such as the first and second upper rail brackets 120, 124, and a cushion pan 127. The cushion pan 127 may extend between the front portions 106a of the transmission brackets 106. A pair of side panels 116 may be coupled to or pivotally attached to the upper rail brackets 120, 124 by one or more fasteners 118.

The backrest assembly 104 may also be referred to as a backrest frame or backrest and the backrest assembly may be pivotally coupled to the cushion assembly 102 by an adjustment fitting such as a recliner 112. A transmission member such as a transmission bracket 106 may extend between the backrest 104 and the cushion assembly 102. The transmission bracket 106 may include a front portion 106a that may form a portion of the cushion assembly 102 and a rear portion 106b. The front portion 106a may be configured to support a cushion, upholstery, trim, or some combination thereof (not illustrated) to support an occupant (not illustrated) seated in the vehicle seat 100.

The rear portion 106b of the transmission bracket 106 may fixed to the backrest 104 by an attachment member such as a fastener or stud 114 that may be configured to transmit movement of the backrest 104 to the cushion assembly 102. As an example, as the recliner 112 is unlocked and the backrest 104 is reclined rearward, the backrest 104 carries the stud 114 and the transmission bracket 106 rearward, which may pivot the front links 122, 126 rearward about the upper rails brackets 120, 124. Moreover, as the recliner 112 is unlocked and the backrest 104 is reclined or tilted forward, the backrest 104 carries the stud 114 and the transmission bracket 106 forward to pivot the front links 122, 126 forward about the upper rail brackets 120, 124.

As another example, the vehicle seat 100 may be moved to a non-use position, such as a boarding position to move the seat 100 forward to provide additional space for ingress and egress in and out of the vehicle. To execute the movement of the seat 100 to the boarding position, a latch 150 (FIG. 2) may be unlocked to release a striker 110, that may be fixed to or form part of the base 103, so that a rear portion of the side panel 116 may be moved forward and away from the base 103. As the seat 100 moves to the non-use position, the transmission bracket 106 may maintain an angle between the cushion assembly 102 and the backrest 104, thus avoiding the need to remove a child safety seat (not illustrated) disposed in the vehicle seat and/or avoiding readjustment of the backrest angle when the vehicle seat 100 is returned to the use position.

Figure 2:
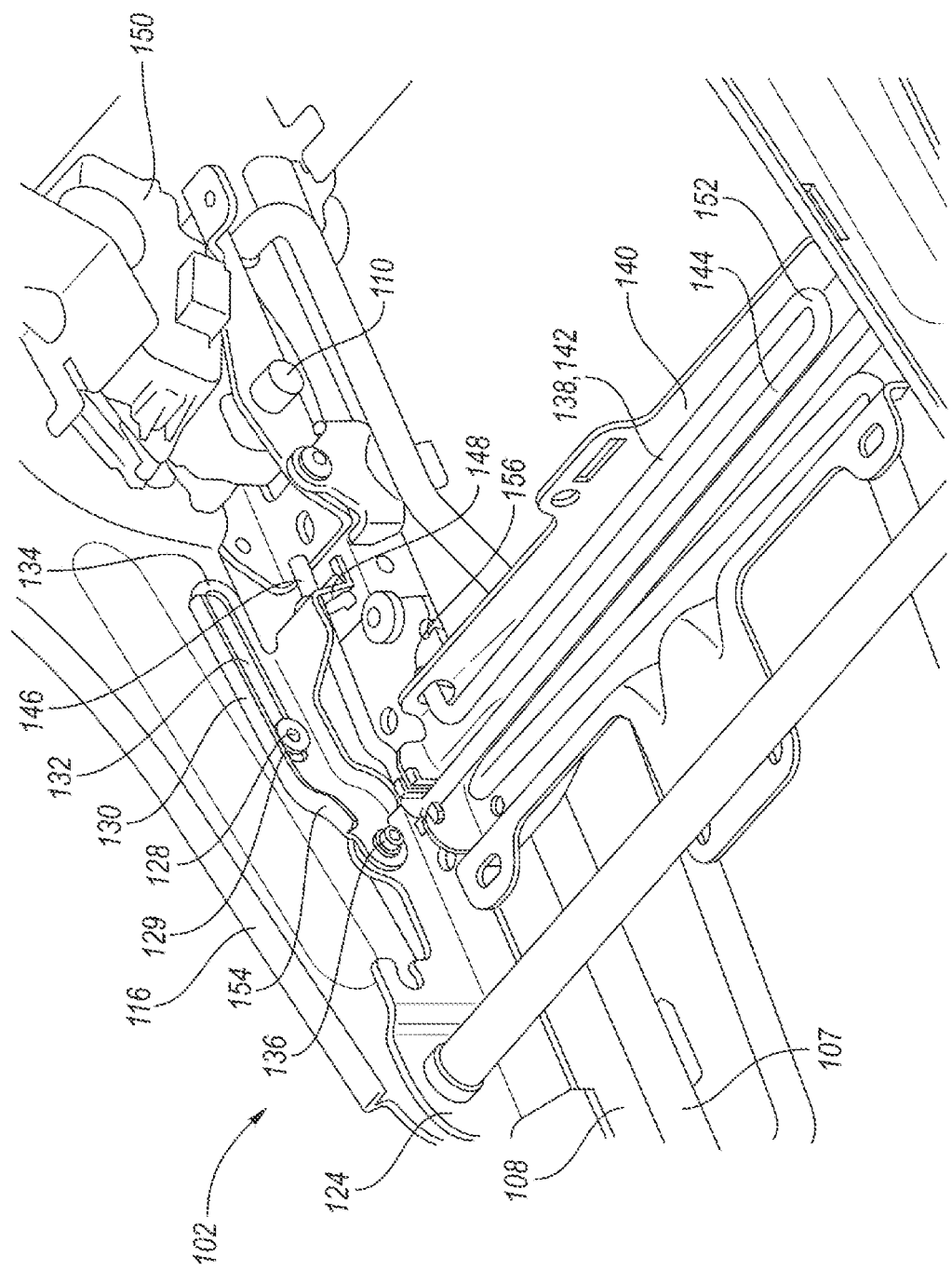
FIG. 2 illustrates a detailed-perspective view of a portion of another exemplary seat assembly.
Figure 3:
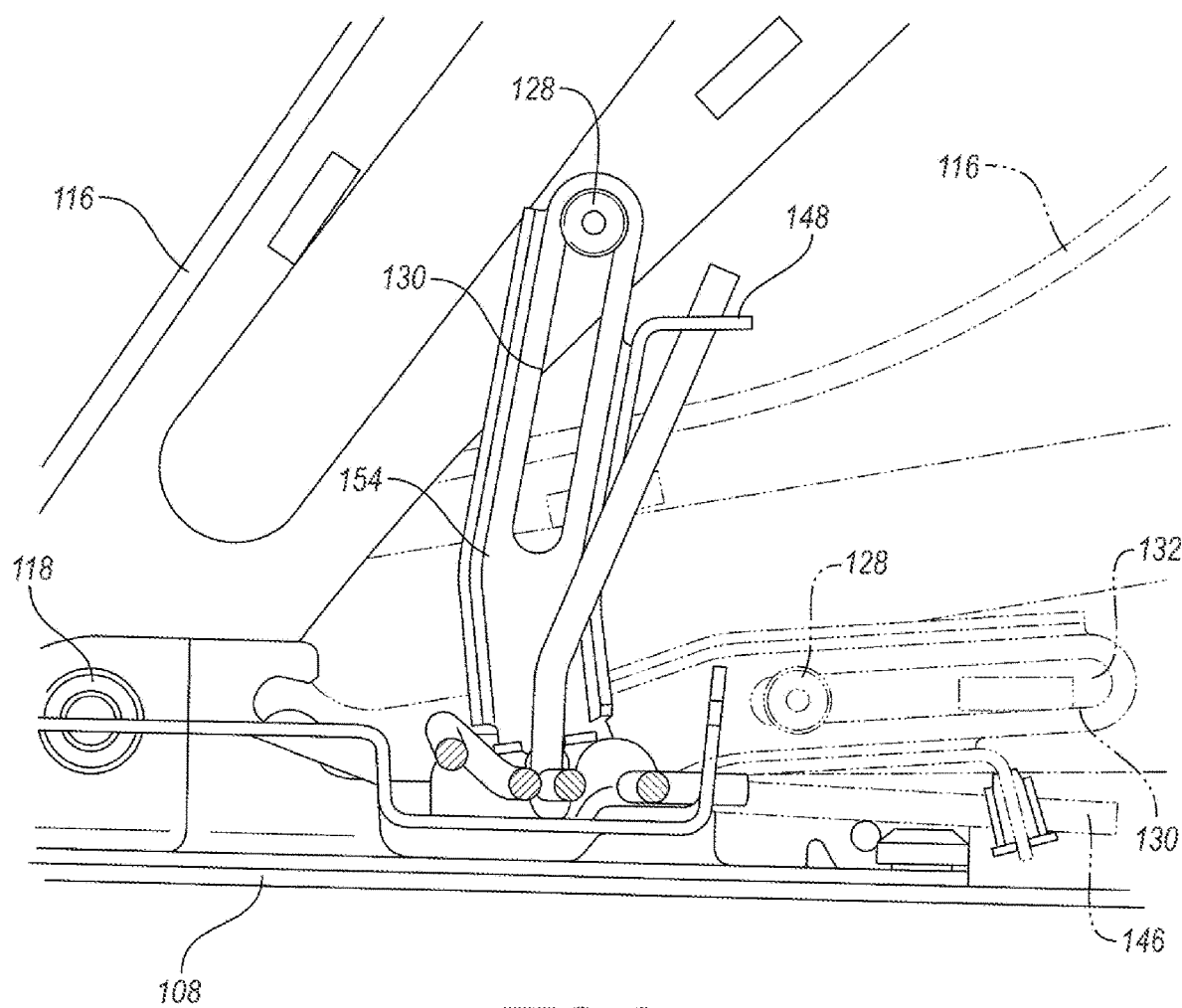
FIG. 3 illustrates a detailed-plan view of a portion of the seat assembly illustrated in FIG. 2.

FIG. 2 illustrates a perspective view of a portion of the cushion assembly 102 disposed in the use position and FIG. 3 illustrates a plan view of the cushion assembly disposed in the non-use position. The vehicle seat 100 may be moved to the non-use position, such as the boarding position by one or more mechanisms such as a cam and cam follower. The cam may be formed by an elongated bracket 130 that may be pivotally coupled to one or more portions of the base 103, such as the upper rail brackets 120, 124 by a fastener 136 or another attachment member, as required. The cam 130 may be configured to engage the cam follower, which may be formed by a fastener such as a shoulder bolt 128 that may be attached to the side panel 116. As one example, the cam follower or the surface that engages the cam may be formed by an outer surface of the shoulder 129 of the shoulder bolt 128. As another example, the cam follower 129 may be formed by a protrusion or another suitable surface that may be integrally formed by the side panel 116.

The cam 130 may be configured to rotate between a first position (FIG. 2), in which the seat cushion is in the use position, and a second position (FIG. 3), in which the seat cushion is in a non-use position, such as the boarding position. As the cam 130 rotates between the first position and the second position, a front portion of the cushion assembly 102, such as the cushion pan 127, may be tilted towards the base 103 and a rear portion of the seat cushion assembly 102 may be tilted away from the base 103. In one or more embodiments, the elongated bracket 130 may define a slot 132 and an inner periphery of the slot 132 may form a cam surface or surfaces of the cam 130 that may engage the shoulder 129 of the cam follower 128. The slot 128 may terminate at a closed end 134 of the elongated bracket 130 and the closed end 134 may engage the cam follower 128 to provide an end stop to prevent additional movement of the cam 130, the side panel 116, and the cushion assembly 102 as a whole, once the cushion assembly 102 and vehicle seat 100 are in the non-use or boarding position.

In one or more embodiments, a spring, such as a torsion spring 138 may be provided to bias the cam 130 towards the second position, as illustrated in FIG. 3. The torsion spring 138 may include one or more legs, such as a first leg 142 and a second leg 144, that may be connected by a bent or curved portion 152. The second leg 144 of the torsion spring 138 may be arranged parallel to the side panel 116 and inserted in or engaged with a flange such as a spring retention portion 148 that may extend from a main body 154 of the cam 130. As an example, the main body 154 of the cam 130 may be disposed between the side panel 116 and the spring retention portion 148. While the vehicle seat 100 includes the torsion spring 138, another mechanism such as a spindle drive or pinion drive may be used in place of or in combination with the torsion spring 138.

The length of the spring may necessitate the first and second legs 142, 144 of the torsion spring 138 to provide sufficient spring force to bias the cam 130 and move the vehicle seat assembly 100 from the use position to the non-use position. As an example, the first and second legs 142, 144 may lie along portions of the base 103, such as a transverse bracket 140 that may extend in a transverse direction. As an example, the first leg 142 of the torsion spring 138 may include an end portion that may be disposed in an aperture defined by the transverse bracket 140, and an end portion 156 of the second leg 144 of the torsion spring 138 may be fixed to the flange or the spring retention portion 148.

As referred to above, the cushion assembly 102 may include the latch 150 that may be configured to selectively change between a locked state (FIG. 2 and FIG. 4), in which the latch 150 locks the rear portion of the cushion assembly 102 to the base 103, and an unlocked state (FIG. 3 and FIG. 5), in which the latch 150 unlocks the rear portion of the cushion assembly 102 from the base 103. The latch 150 in the locked state engages the striker 110 that is attached to or integral to the base 103.

FIG. 3 illustrates a plan view of a portion of the cushion assembly 102 disposed in the non-use position and the use position. Portions of the cushion assembly 102 disposed in the use position are represented by hidden lines and portions of the cushion assembly 102 disposed in the non-use position are represented by solid lines. When the cushion assembly 102 is in the use position, the cam 130 in the first position may arranged substantially parallel to the translatable rail 108 and the cam follower 128 may be spaced apart from an end portion of the slot 132.

Figure 4:
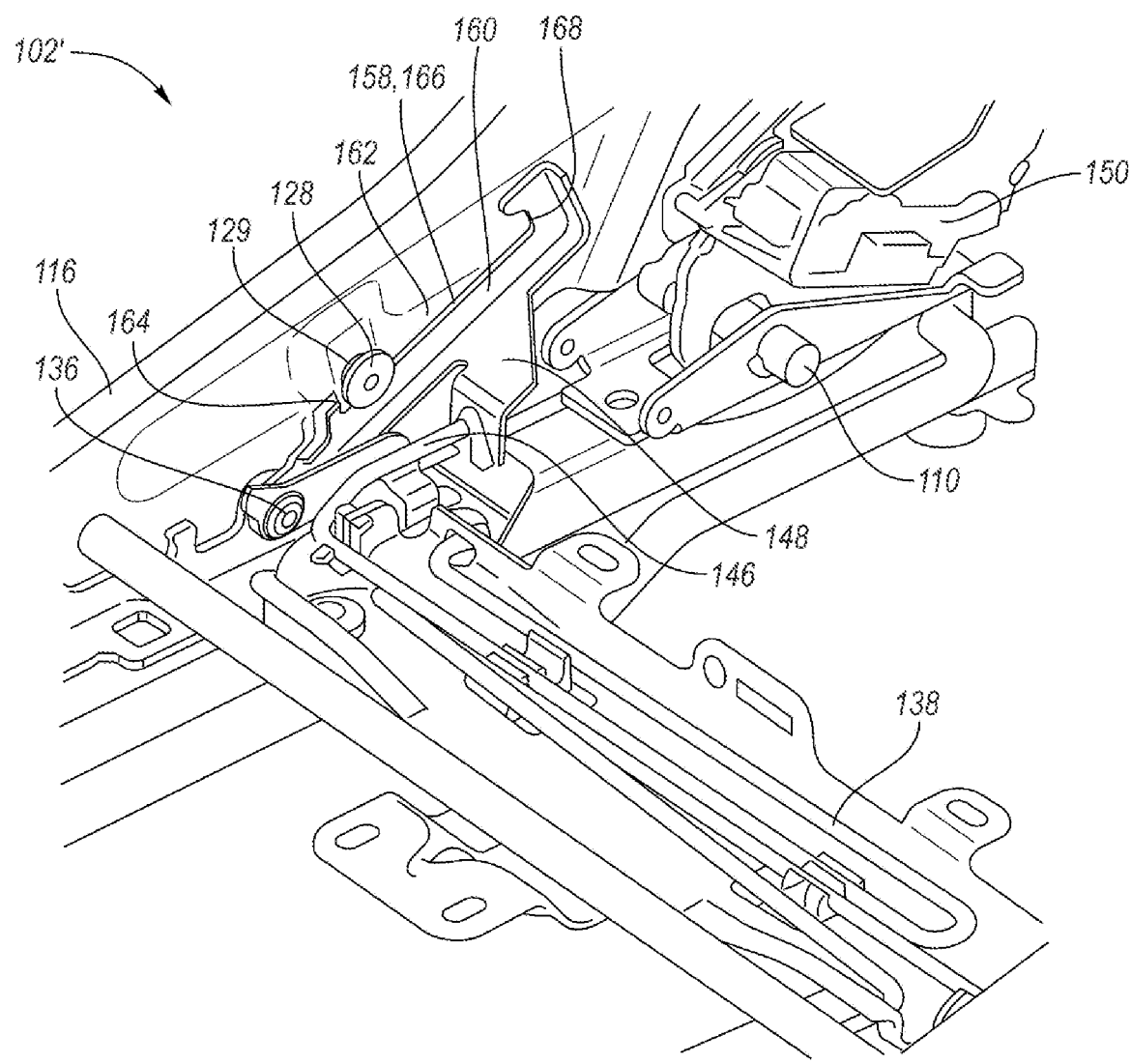
FIG. 4 illustrates a detailed-perspective view of a portion of the exemplary seat assembly illustrated in FIG. 1.
Figure 5:
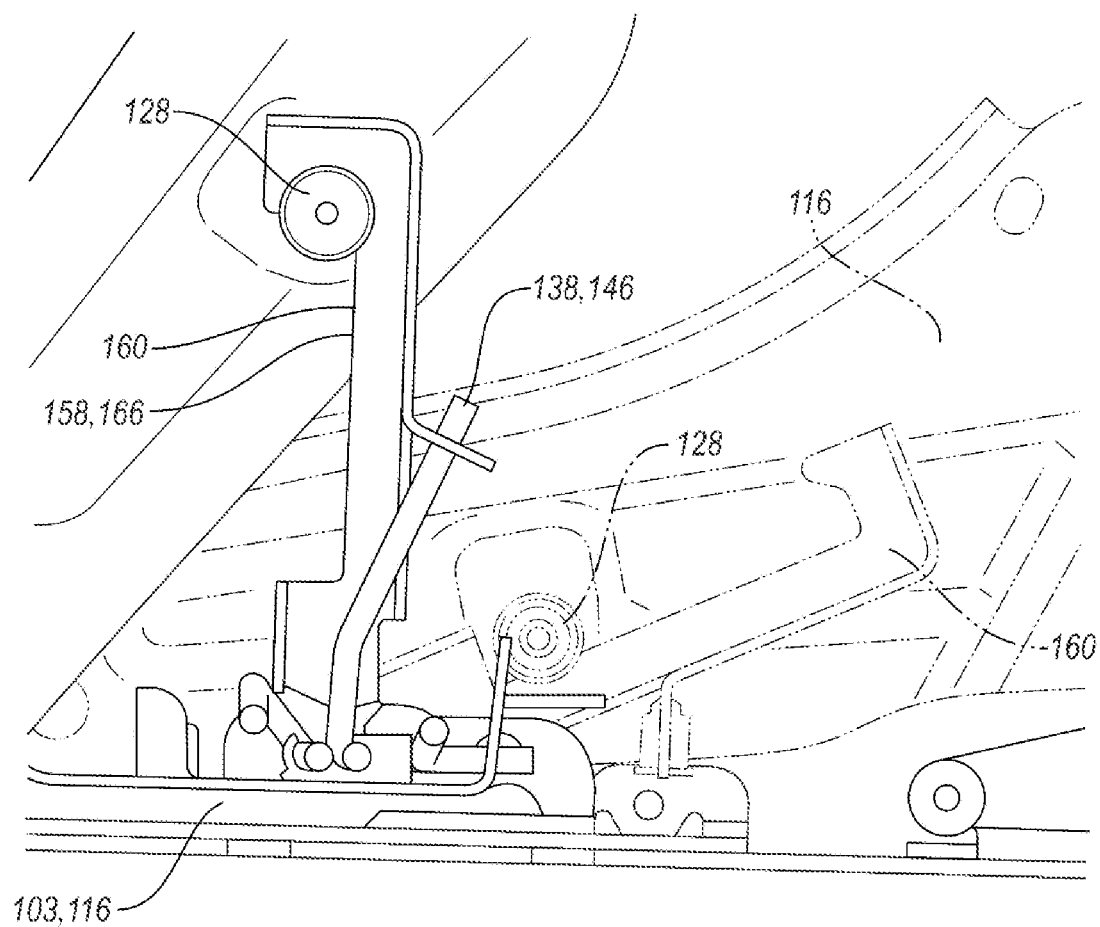
FIG. 5 illustrates a detailed-plan view of a portion of the exemplary seat assembly illustrated in FIG. 4.

FIG. 4 illustrates a perspective view of a portion of another cushion assembly 102' disposed in the use position and provided with another cam 158, according to one or more embodiments. FIG. 5 illustrates a detailed-plan view of the cushion assembly 102' disposed in the use position and the non-use position. For purposes of clarity, in FIG. 5 portions of the cushion assembly 102 disposed in the use position are represented by hidden lines and portions of the cushion assembly 102 disposed in the non-use position are represented by solid lines.

In one or more embodiments, the cam 158 may be formed by an elongated bracket 158 that may define a cutout 162 that may form a U-shaped inner periphery. The U-shaped inner periphery may be formed by a proximal leg 164, a distal leg 168, and a medial leg 166 extending therebetween. As an example, the proximal leg 164 may be positioned closer to the first end of the cam 158, such as the end pivotally coupled to the base 103 by the fastener 135. When the cam 158 is in the first position (FIG. 4) the proximal leg 164 may be spaced apart from the cam follower 128. As the cam 158 rotates about the fastener 136 from the first position the cam follower 129 may move along the medial leg 166 until the cam follower 129 engages the distal leg 168 to form an end stop to prevent additional movement of the cushion assembly 102' and the vehicle seat 100 beyond the non-use position. As stated above, the end portion 146 of the torsion spring 138 may be engaged or inserted into the flange, such as the spring engagement portion 148.

FIG. 6 illustrates another exemplary cam 170 that may be formed by another elongated bracket 170, disposed in the first position, in which the vehicle seat is in the use position. FIG. 7 illustrates the cam 170 and the seat 100 disposed in the non-use position or boarding position. For purposes of clarity the spring 138 that engages and biases the cam 170 is not illustrated in FIG. 6 and FIG. 7. In one or more embodiments, the base 103 may include an unlocking device 172 that may be configured to selectively lock and unlock the translatable rail 108 from the fixed rail 107 so that the translatable rail 108 may move along the fixed rail 107.

The unlocking device 172 may include one or more pins 174 that may be coupled to the translatable rail 108 and a locking bolt 176 that may be coupled to the one or more pins 174. The unlocking device 172 may include an unlocking lever 178 that may be configured to engage and move the locking bolt 176 to raise the pins 174 so that the pins 174 disengage the fixed rail 107. The unlocking lever 178 may include a first portion or first arm 180 and a second portion or second arm 182 that may extend from the first arm 180. The unlocking lever 178 may be pivotally coupled to a portion of the base 103, such as the fixed rail 107, the translatable rail 108, or the upper rail brackets 120, 124.

The cam 170 may include an actuation arm 184 that may extend from the elongated body of the cam 170. In response to the cam being moved or biased to rotate about the fastener 136, such as by releasing the latch 150 from the striker 110, the actuation arm 184 may pivot towards the second arm 182 of the unlocking lever 178. An engagement portion 186 disposed on a distal end of the actuation arm 184 may contact the second arm 182 of the unlocking lever 178 and pivot the unlocking lever 178 so that the first arm 180 of the unlocking lever engages and lifts the unlocking bolt 176 to disengage the locking pins 174 from the fixed rail 107, so that the translatable rail 108 may translate forward along the fixed rail 107.

Figure 8:
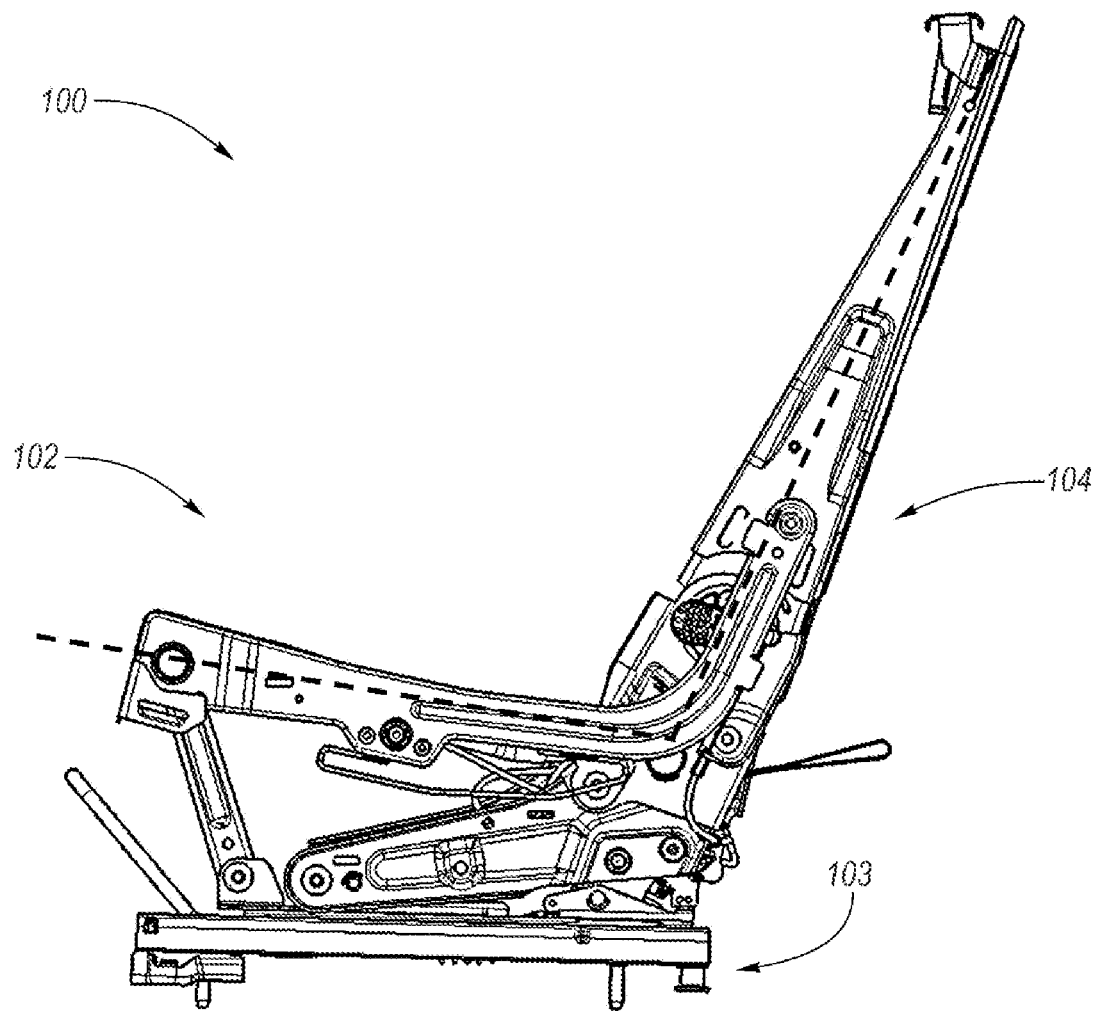
FIG. 8 illustrates a plan view of the exemplary seat assembly in the use position.
Figure 9:
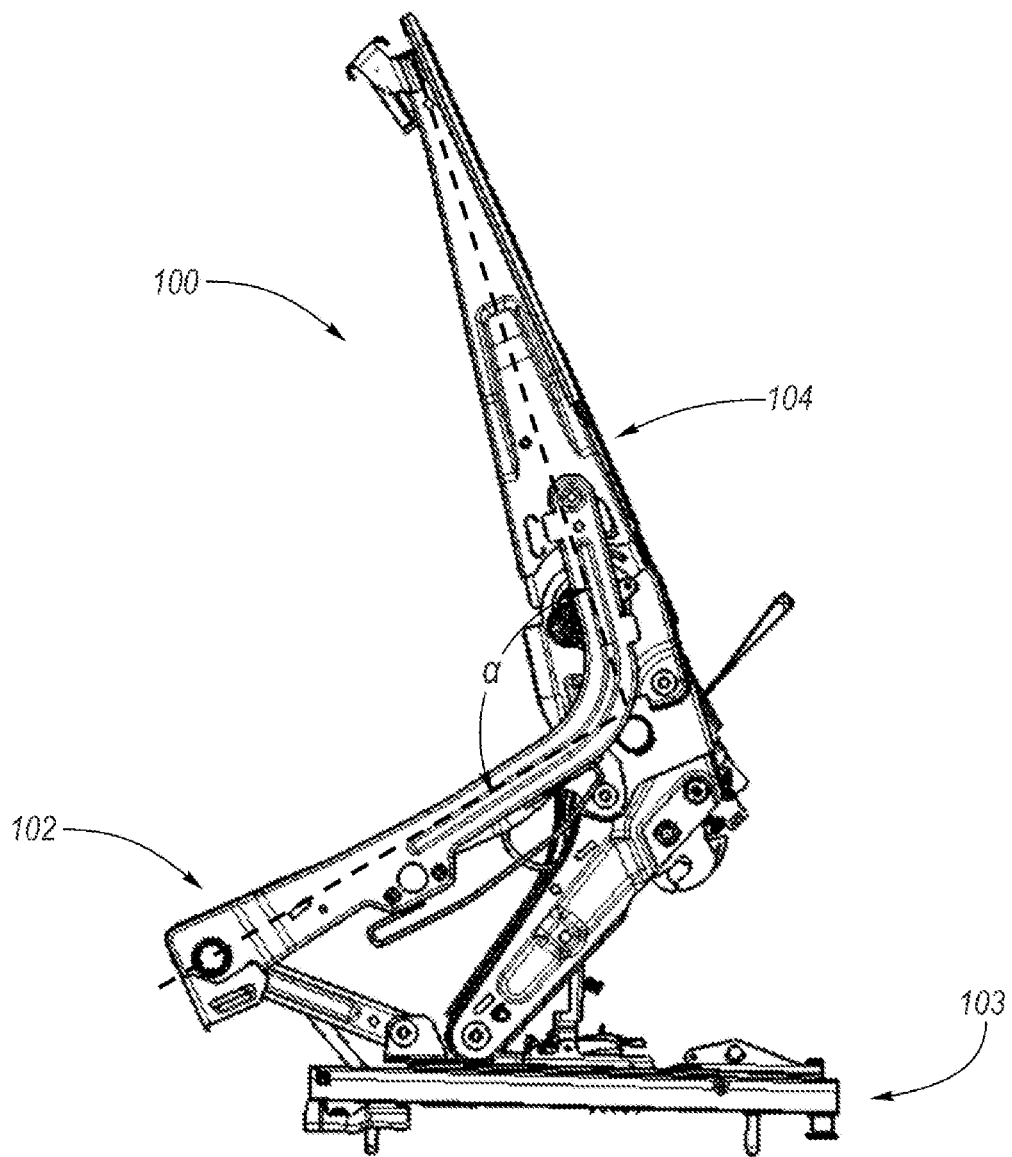
FIG. 9 illustrates a plan view of the exemplary seat assembly in a non-use position, such as a boarding position.
Figure 10:
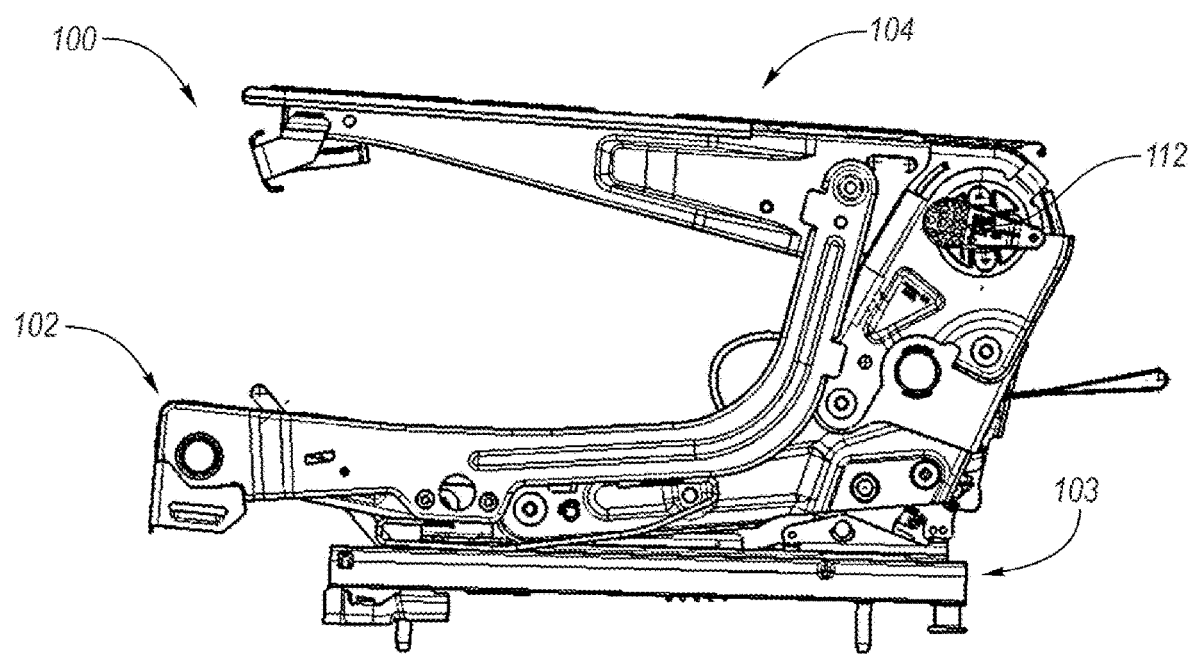
FIG. 10 illustrates a plan view of the exemplary seat assembly in a non-use position, such as a fold-flat position.

FIG. 8 illustrates a plan view of the seat assembly 100 in the use position. The base 103 may support the cushion assembly 102 and the backrest 104. In the use position, the backrest 104 and the cushion assembly 102 may form an angle α as represented by the dashed lines extending through the cushion assembly 102 and the backrest 104. FIG. 9 illustrates a plan view of the seat assembly 100 in a non-use position, such as a boarding position. In the boarding position, a rear portion of the cushion assembly 102 is tilted forward and away from the base 103 and a front portion of the cushion assembly 102 is tilted forward and towards the base 103. The cushion assembly 102 and the backrest 104 may be collectively arranged to maintain the angle α from the use position. FIG. 10 illustrates a plan view of the seat assembly 100 in a non-use position, such as a fold-flat position. To move the seat 100 to the fold-flat position, the recliner 112 may be actuated to tilt the backrest 104 towards the cushion assembly 102 and move the cushion assembly 102 towards the base 103.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

PARTS LIST

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

100 vehicle seat
102 cushion assembly
103 base
104 backrest
105 vehicle floor
106 transmission bracket
108 translatable rail
107 fixed rail
110 striker
112 recliner
114 stud
116 side panels
118 pivot member
120 first upper rail bracket
122 first front link
124 second upper rail bracket
126 second front link
127 cushion pan
128 cam follower
130 cam, elongated bracket
132 slot
134 end stop
136 pivot fastener
138 torsion spring
140 transverse bracket
142 first leg
144 second leg
146 end portion of second leg
148 spring engagement portion
150 latch
152 bent portion
154 main body of cam
156 first end
158 cam, elongated bracket
160 main body of cam
162 cutout
164 proximal leg
166 medial leg
168 distal leg
170 cam elongated bracket
172 unlocking device
174 locking pins
176 locking bolt
178 unlocking lever
180 first arm
182 second arm
184 arm of cam
186 engagement portion
188 fastener

What is claimed is:

1. A seat assembly for use in a vehicle, the seat assembly comprising:
a base;
a seat cushion pivotally coupled to the base;
a backrest pivotally coupled to the seat cushion;
a cam follower coupled to the seat cushion; and
a cam rotationally coupled to the base and configured to engage the cam follower, the cam configured to rotate between a first position, in which the seat cushion is in a use position, and a second position, in which the seat cushion is in a non-use position,
wherein as the cam rotates between the first position and the second position, a front portion of the seat cushion is tilted towards the base and a rear portion of the seat cushion is tilted away from the base.

2. The seat assembly of claim 1, further comprising:
a spring configured to bias the cam towards the second position; and
a latch configured to selectively change between a locked state, in which the latch locks the rear portion of the seat cushion to the base, and an unlocked state, in which the latch unlocks the rear portion of the seat cushion from the base.

3. The seat assembly of claim 1, wherein the cam follower is formed by a fastener.

4. The seat assembly of claim 1, wherein the cam is formed by an elongated bracket including a first end and a second end, the first end rotationally coupled to the base and the second end forming an end stop configured to engage the cam follower and stop the seat cushion from moving beyond the non-use position.

5. The seat assembly of claim 4, wherein the elongated bracket defines a slot and the cam follower is formed by a fastener provided with a shoulder and a head, the shoulder disposed within and configured to move along an inner periphery of the slot.

6. The seat assembly of claim 5, wherein the elongated bracket defines a cutout provided with a U-shaped inner periphery, the U-shaped inner periphery having a proximal leg, a distal leg, and a medial leg extending therebetween, wherein the shoulder of the fastener moves along the medial leg as the cam rotates between the first position and the second position.

7. The seat assembly of claim 6, wherein the distal leg forms the end stop.

8. The seat assembly of claim 6, wherein the proximal leg is closer to the first end than the second end of the elongated bracket, and when the cam is in the first position, the proximal leg is spaced apart from the cam follower.

9. A seat assembly configured to move between a use position, a fold-flat position, and a boarding position, the seat assembly comprising:
a base;
a seat cushion including a side panel, the side panel including a first end, pivotally coupled to the base, and a second end spaced apart from the first end;
a backrest pivotally coupled to the seat cushion;
a cam follower coupled to the seat cushion; and
a cam rotationally coupled to the base and configured to engage the cam follower, the cam configured to rotate between a first position, in which the seat cushion is in either the use position or the fold-flat position, and a second position, in which the seat cushion is in the boarding position,
wherein as the cam rotates between the first position and the second position, a front portion of the seat cushion is tilted towards the base and the second end of the side panel is tilted away from the base.

10. The seat assembly of claim 9, wherein the base includes a rail and a rail bracket fixed to the rail, the cam is rotationally coupled to the rail bracket.

11. The seat assembly of claim 9, further comprising:
a spring configured to bias the cam towards the second position.

12. The seat assembly of claim 9, further comprising:
an elongated bracket including a main body provided with a first end rotationally fixed to the base, the main body forming the cam.

13. The seat assembly of claim 12, further comprising:
a spring including a first end, fixed the base, and a second end, wherein the elongated bracket includes a flange extending from the main body, the second end of the spring fixed to the flange of the elongated bracket.

14. The seat assembly of claim 13, wherein the main body is disposed between the side panel and the flange.

15. The seat assembly of claim 13, wherein the base includes,
a transverse bracket, wherein the spring includes a first leg and a second leg connected to the first leg by a bent portion, the first and second legs and the bent portion extending along the transverse bracket, and the first end disposed in an aperture defined by the transverse bracket.

16. The seat assembly of claim 13, further comprising:
a recliner pivotally coupling the backrest to the seat cushion;
a cushion pan forming the front portion of the seat cushion and pivotally coupled to the base; and
a transmission bracket including a first portion and a second portion, the first portion including a first end fixed to the backrest and the second portion forming a portion of the seat cushion and including a second end coupled to the cushion pan,
wherein the transmission bracket, the seat cushion, and backrest are collectively arranged such that when the recliner is unlocked and the cam is in the first position, an angle between the seat cushion and the backrest is maintained as the backrest is pivotally adjusted.

17. A vehicle seat comprising:
a base including,
a fixed rail configured to be attached to a vehicle floor,
a translating rail configured to move along the fixed rail,
a rail bracket fixed to the translating rail;
a seat cushion including a side panel provided with a first end and a second end, the first end pivotally coupled to the rail bracket;
a backrest pivotally coupled to the seat cushion by a recliner;
a cam follower coupled to the seat cushion; and
a cam disposed between the first end and the second end of the side panel and rotationally coupled to the rail bracket; and
the cam configured to rotate in a first rotational direction, to raise the second end of the side panel away from the base and rotate the first end of the side panel, and a second rotational direction to lower the side panel towards the base.

18. The vehicle seat of claim 17, wherein the first rotational direction is towards the first end of the side panel.

19. The vehicle seat of claim 17, further comprising:
an unlocking device including an actuation lever configured to unlock the translating rail from the fixed rail, wherein the cam is formed by an elongated bracket, the elongated bracket includes a first arm configured to engage the actuation lever to unlock the translating rail from the fixed rail.

20. The vehicle seat of claim 19, further comprising:
a spring, wherein the elongated bracket includes a second arm configured to receive an arm of the spring, the spring configured to bias the cam in the first rotational direction.

* * * * *